UNITED STATES PATENT OFFICE.

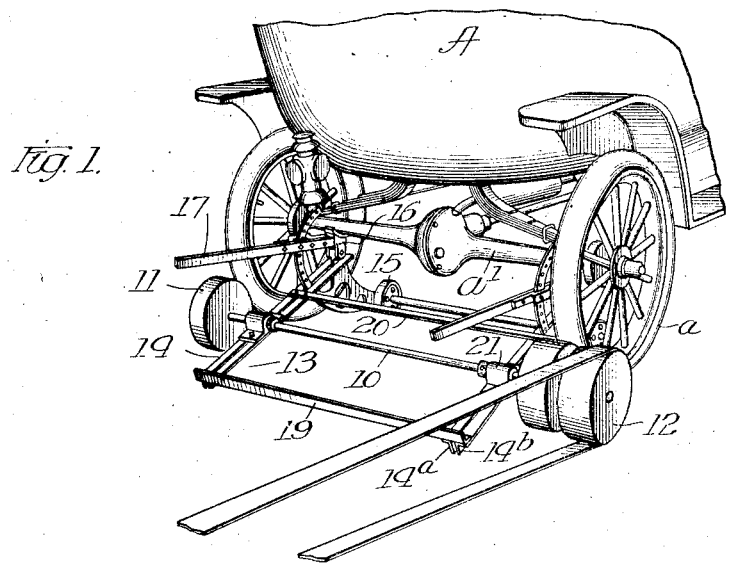
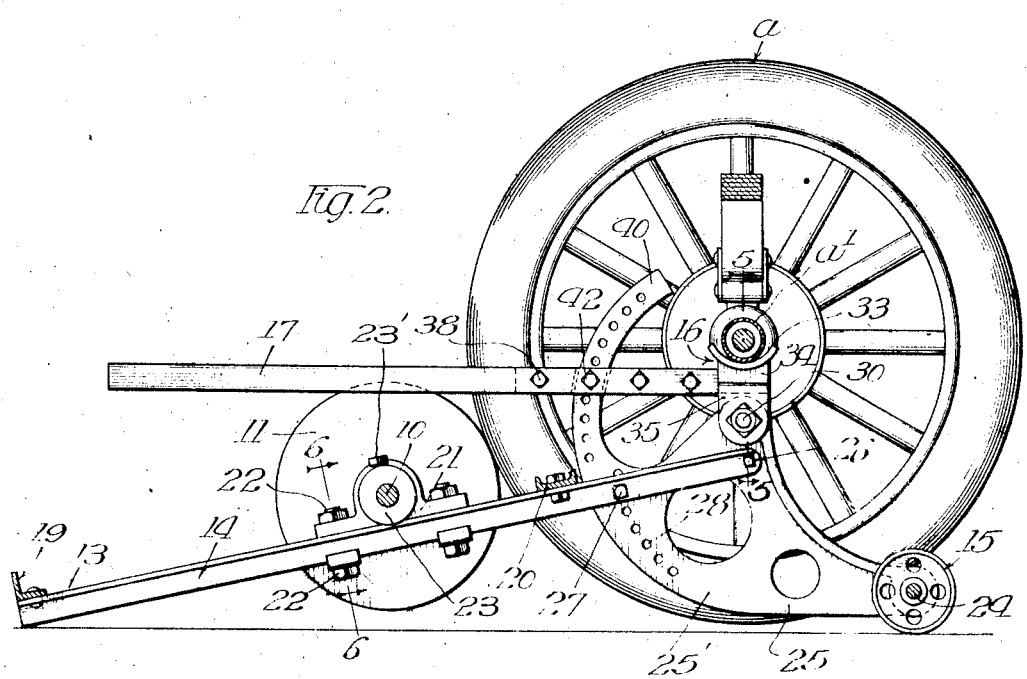

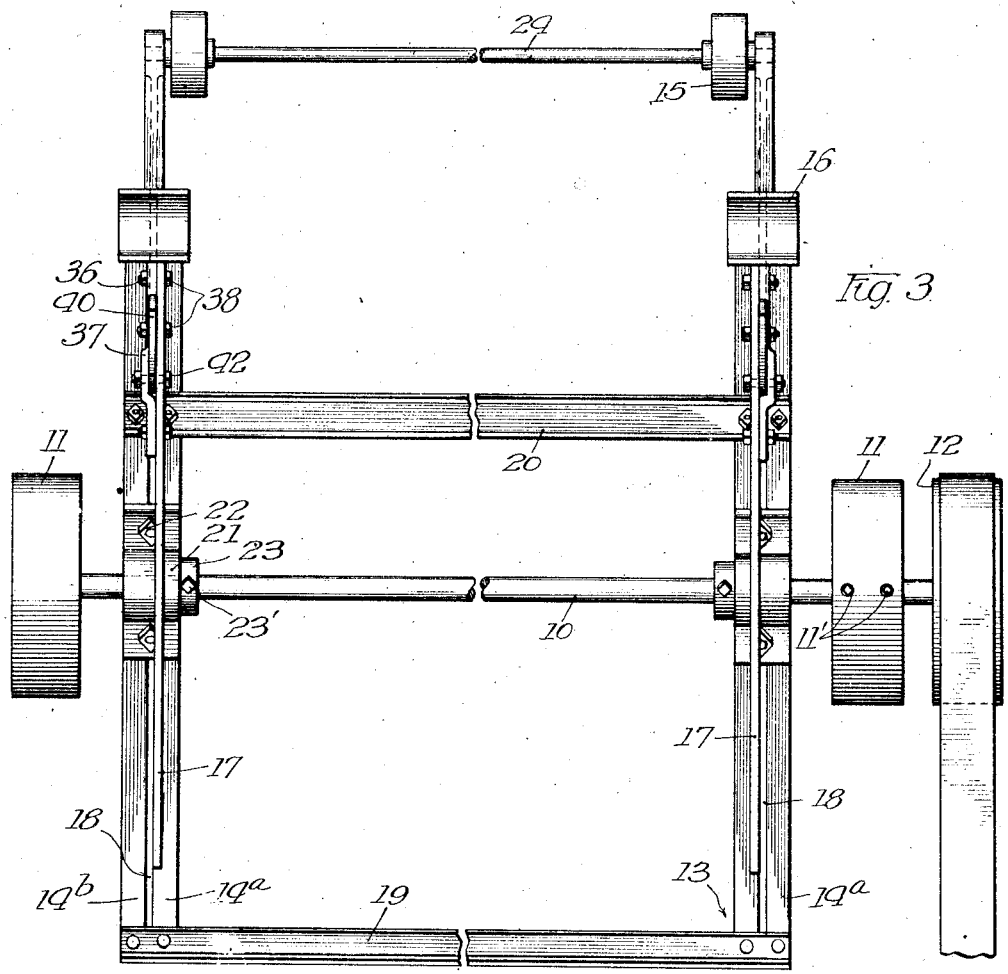

EMMET L. VAN DOLSEN, OF LAPORTE, INDIANA, ASSIGNOR OF ONE-HALF TO LOREN M. RUSSELL, OF LAPORTE, INDIANA.

POWER TRANSMISSION.

1,225,081.  Specification of Letters Patent.  Patented May 8, 1917.

Application filed March 16, 1916. Serial No. 84,502.

*To all whom it may concern:*

Be it known that I, EMMET L. VAN DOLSEN, a citizen of the United States, residing at Laporte, in the county of Laporte and State of Indiana, have invented certain new and useful Improvements in Power Transmission, of which the following is a specification.

My invention provides means for utilizing the power of an automobile, enabling the automobile to be used as a stationary power plant. To this end the traction wheels of the automobile are raised from the ground and brought into power-communicating relation to a shaft forming part of the novel equipment, so that the automobile-engine will supply its power through the traction wheels to the power shaft of said equipment.

Among the objects of my invention are to provide a device that is simple, inexpensive, adjustable to meet the requirements imposed by differences in sizes and relative conformation of parts of different automobiles, and arranged for facility of operation so that it may conveniently be worked by one man.

In the drawings, wherein I have illustrated an embodiment of my invention,

Figure 1 is a perspective view of the appliance in use.

Fig. 2 is a longitudinal section therethrough.

Fig. 3 is a plan view.

Fig. 4 is a detail of the saddle, etc.

Fig. 5 is a section on line 5—5 of Fig. 2.

Fig. 6 is a section on line 6—6 of Fig. 2.

Generally the equipment embodying my invention provides means for lifting the automobile A, and bringing its traction wheels $a$ into working coöperation with the power shaft 10. The power shaft 10, carrying driven wheels 11 for peripheral engagement with the traction wheels $a$, and carrying also a pulley wheel 12, (typifying any suitable means for power-delivery) is mounted for adjustment along a frame 13 of adjustable inclination that preferably receives ground bearing on the side bars 14 at its rear end, and that has its front end supported, adjustably as to height, on front wheels 15. This frame carries preferably between the forward and rearward ground-bearings, saddles 16 for engagement with the rear axle housing $a^1$ of an automobile, said saddles being movable as by levers 17, both to elevate the rear end of the automobile (to remove the traction wheels $a$ from contact with the ground) and to bring said traction wheels into engaging contact with the driven wheels 11 on the frame. For this purpose the saddles are preferably pivoted and are positioned above their pivotal axis.

In the specific construction shown, each side member 14 of the frame is composed of two angle irons $14^a$ and $14^b$, disposed to form jointly a split-T-arrangement with a slot 18 between the contiguous sides of the angle-irons. The two side members of the frame are connected by angle or channeled cross braces 19 and 20, so that the frame body is in effect a metallic rectangle with longitudinally slotted side members. Such construction is advantageous and inexpensive. The bearings 21 for the power shaft 10 are connected to the side members by bolts 22 taking through the slots 18, so that the shaft may be adjusted fore and aft on the frame, by moving its bearing members, there being collars 23, secured by set screws 23', on the shaft to position it against endwise displacement. The driven friction-wheels 11 may be secured to the shaft, as by set screws 11', for axial adjustment, to compensate for variations in the width of the vehicle tread (although standardization of the tread width of automobiles of the present market make this almost unnecessary) and of course the power delivery pulley 12 may be applied at any point on the shaft that is desired.

The rear end of the frame may be permitted to rest directly on the ground so that the sharp corners of its angle iron side members constitute holding points, but of course the extremities of the frame may be shod for support in other fashion if desired.

The front end of the frame is supported, preferably on the small wheels 15, in such fashion that the frame as a whole stands at an angle to the ground, and preferably so that the front extremity of the frame may be raised or lowered at will. Thus wheels 15 are mounted on a cross shaft 24 connecting the extremities of two leg-members 25, (preferably curved and rib-strengthened) each of which has a broad web 25', with an arcuate edge, passing into the slot 18 of the appropriate side member 14, the extremity of which is pivoted as at 26 to the front or leg portion of the bracket at or below the center from which the edge-arc is struck. A bolt 27 taking through the side member 14 of the frame into any one of a series of apertures 28 in the arcuate web portion 25' of the leg, enables the angle between the leg and the frame to be varied thereby to vary the elevation of the front end of the frame and consequently its inclination.

Each saddle-casting 16 is pivoted as at 30 to the leg structure 25 above the frame pivot 26, so that manifestly by rocking the saddle from a point in front of its vertical dead-center, toward dead center position, the concaved seat of the saddle will be both elevated and retracted. In specific construction the saddle member 16 provides a bearing head 33 concaved to coöperate with an automobile axle housing, a stem 34 divided into parallel limbs 35 that straddle the top portion of leg 25 to receive the pivot 30, and a lever-attachment-stub 36 that has an offset portion 37 between its ends. This offset is overlain by the lever 17 that is bolted in place, as at 38, thereby affording in the offset a rectangular guide-eye 39. For retaining the lever-operated saddle in any position of adjustment the lever must be locked in relation to the frame. Preferably web 25' of each adjustable front leg 25 is provided with an arcuate extension arm 40 struck from pivot 30 as a center. This arm passes through the eye 39 and has a number of holes 41 to receive a locking pin 42 that passes through openings in the sides of the eye.

In operation the vehicle and the power-converting equipment are brought into proximity, it being easy to wheel the equipment around on its front wheels, wheel-barrow fashion, upon occasion. The legs 25 are preliminarily adjusted at 27 so that the saddles 16 stand at approximately the height of the rear axle housing. The bearing brackets 21 for the power shaft are adjusted longitudinally in slots 18 so that the peripheries of driven wheels 11 are removed from the pivotal points 30 for the saddles at a distance a little less than the radius of the vehicle wheels. These two adjustments, when made for any one machine, are preserved, of course, until a machine of materially different wheel diameter or relative proportions is to be served.

The hand levers 17 are freed from fixed engagement with the arcs 40, by withdrawal of pins 42; the levers are swung upward to throw the saddles forwardly beyond their pivotal axis, these saddles are placed beneath the axle housing of the automobile and then mere depression of the levers 17 lifts the rear end of the automobile and draws it rearwardly, bringing the wheel tires into frictional driving contact with the driven wheels 11. The levers 17 are, of course, then secured by pins 42 in such working position to maintain the driving relationship.

While I have herein described in some detail a particular embodiment of my invention, involving some refinements that are advantageous and that I may specifically claim for their advantages, it will be apparent to those skilled in the art that in its broad aspect my invention is not limited to the details illustrated for purposes of full disclosure and that many changes may be made in the construction without departure from the spirit of my invention and within the scope of the appended claims.

Having described my invention, what I claim is:

1. In equipment of the character described, a frame-rectangle, a power shaft thereon, legs pivoted to the front end of the frame, means to lock the legs in adjusted positions to determine the height of the frame end, a pair of saddles pivoted below their heads adjacent the front end of said frame, lever means for moving said saddles and means to fix said lever means in adjusted position.

2. In equipment of the character described, a frame-rectangle, a power shaft thereon adjustable longitudinally of the frame, legs pivoted to the front end of the frame, means to lock the legs in adjusted positions to determine the height of the frame end, a pair of saddles pivoted below their heads adjacent the front end of said frame, lever means for moving said saddles and means to fix said lever means in adjusted position.

3. The combination of a frame having slotted side bars, shaft brackets adjustable in the slots, a power shaft therein bearing friction wheels, adjustable legs for the front end of the frame, pivoted saddle members, lever means to move said saddle members, and means to lock said levers in adjusted position.

4. The combination of a frame comprising connected side members each comprising angle-irons set in slit-T arrangement, shaft bearings adjustable on said side members having bolts passing through the slot between the angle irons, a power shaft in said bearings, and means connected with the frame for lifting an automobile traction wheel from the ground into driving relation to the power-shaft.

5. The combination of a frame, wheel-supported legs at the front of the frame disposing said frame in inclined position with its rear end resting on the ground, a power-shaft carried by the frame, and means connected with the front end of the frame to lift an automobile wheel from the ground into power-delivering relation to the power-shaft.

6. In an equipment of the character described, front legs, a frame pivoted thereto, means for locking the legs at adjusted angles to the frame, a power shaft on the frame, saddles pivoted to the legs below their bearing surfaces and above the frame-pivots, lever means for moving and locking said saddles.

7. In an equipment of the character described, front legs, having extension webs and an arcuate arm, a frame pivoted to said legs, means engaging said frame and webs for locking the legs at adjusted angles to the frame, a power shaft on the frame, saddles pivoted to the legs below their bearing surfaces and above the frame-pivots, lever means for said saddles coöperating with said arcuate arms, and locking means to secure said levers to said arms.

8. In an equipment of the character described for association with the driving wheels of an automobile, a frame comprising a pair of parallel levers and legs pivoted to the front portions of the levers, the rear ends of the levers resting upon the ground, means for locking the pivotal connection between the legs and levers in adjusted position, a pair of saddles carried by the frame, and a power shaft carried by said frame and arranged for driving engagement with the automobile wheels.

9. In an equipment of the character described for association with the driving wheels of an automobile, a frame comprising a pair of parallel levers and legs pivoted to the front portions of the levers, the rear ends of the levers resting upon the ground, means for maintaining the legs and levers in spaced relation to each other, ground contacting wheels on the ends of said legs, means for locking the pivotal connections between the legs and levers in adjusted position, a pair of saddles carried by the frame, and a power shaft carried by said frame and arranged for driving engagement with the automobile wheels.

In testimony whereof I hereunto set my hand in the presence of two subscribing witnesses.

EMMET L. VAN DOLSEN.

In the presence of—
STANLEY W. COOK,
MARY F. ALLEN.